US011748933B2

(12) United States Patent
Varadarajan et al.

(10) Patent No.: US 11,748,933 B2
(45) Date of Patent: Sep. 5, 2023

(54) METHOD FOR PERFORMING SHADER OCCUPANCY FOR SMALL PRIMITIVES

(71) Applicant: Samsung Electronics Co., Ltd., Suwon-si (KR)

(72) Inventors: Keshavan Varadarajan, Austin, TX (US); David C. Tannenbaum, Austin, CA (US); F N U Gurupad, San Jose, CA (US)

(73) Assignee: SAMSUNG ELECTRONICS CO., LTD.

( * ) Notice: Subject to any disclaimer, the term of this patent is extended or adjusted under 35 U.S.C. 154(b) by 90 days.

(21) Appl. No.: 17/168,168

(22) Filed: Feb. 4, 2021

(65) Prior Publication Data

US 2022/0036631 A1   Feb. 3, 2022

Related U.S. Application Data

(60) Provisional application No. 63/060,653, filed on Aug. 3, 2020.

(51) Int. Cl.
*G06T 1/20* (2006.01)
*G06T 15/00* (2011.01)
*G06T 15/80* (2011.01)

(52) U.S. Cl.
CPC .............. *G06T 15/005* (2013.01); *G06T 1/20* (2013.01); *G06T 15/80* (2013.01)

(58) Field of Classification Search
CPC .......... G06T 1/20; G06T 15/005; G06T 15/80
(Continued)

(56) References Cited

U.S. PATENT DOCUMENTS 7,502,035 B1   3/2009 Moreton
9,721,376 B2   8/2017 Lentz et al.
(Continued)

FOREIGN PATENT DOCUMENTS

WO   2020191920 A1   10/2020

OTHER PUBLICATIONS

Office Action for U.S. Appl. No. 17/503,259, dated Mar. 30, 2023.
(Continued)

*Primary Examiner* — Jacinta M Crawford
(74) *Attorney, Agent, or Firm* — Renaissance IP Law Group LLP

(57) ABSTRACT

A GPU includes shader cores and a shader warp packer unit. The shader warp packer unit may receive a first primitive associated with a first partially covered quad, and a second primitive associated with a second partially covered quad. The shader warp packer unit may determine that the first partially covered quad and the second partially covered quad have non-overlapping coverage. The shader warp packer unit may pack the first partially covered quad and the second partially covered quad into a packed quad. The shader warp packer unit may send the packed quad to the shader cores. The first partially covered quad and the second partially covered quad may be spatially disjoint from each other. The shader cores may receive and process the packed quad with no loss of information relative to the shader cores individually processing the first partially covered quad and the second partially covered quad.

16 Claims, 10 Drawing Sheets

(58) Field of Classification Search
USPC .................................................. 345/426, 501
See application file for complete search history.

(56) References Cited

U.S. PATENT DOCUMENTS

| | | |
|---|---|---|
| 9,779,542 B2 | 10/2017 | Clarberg |
| 9,865,074 B2 | 1/2018 | Berghoff |
| 9,972,124 B2 | 5/2018 | Lentz et al. |
| 10,275,851 B1 | 4/2019 | Zhao et al. |
| 10,769,752 B2 | 9/2020 | Nourai et al. |
| 2017/0032488 A1* | 2/2017 | Nystad ..................... G06T 1/20 |
| 2017/0116698 A1 | 4/2017 | Hakura et al. |
| 2017/0161940 A1 | 6/2017 | Liktor et al. |
| 2017/0309065 A1 | 10/2017 | Lentz et al. |
| 2020/0018965 A1 | 1/2020 | Milner-Moore et al. |
| 2020/0184703 A1 | 6/2020 | Giliberto |
| 2020/0184715 A1 | 6/2020 | Goswami et al. |

OTHER PUBLICATIONS

Corrected Notice of Allowability for U.S. Appl. No. 17/503,259, dated Jul. 3, 2023.
Notice of Allowance for U.S. Appl. No. 17/503,259, dated Jun. 15, 2023.

\* cited by examiner

METHOD FOR PERFORMING SHADER OCCUPANCY FOR SMALL PRIMITIVES

RELATED APPLICATION DATA

This application claims the benefit of U.S. Provisional Application Ser. No. 63/060,653, filed on Aug. 3, 2020, which is hereby incorporated by reference.

TECHNICAL AREA

The present disclosure relates to graphics processing units (GPUs), and more particularly, to a method for performing shader occupancy for small primitives.

BACKGROUND

Modern GPUs include a programmable, highly parallel, set of computation engines, and a collection of various fixed-function units. The fixed-function units may include a texture address generation and filtering unit, a primitive clipping unit, a culling unit, a viewport transforming unit, a binning unit, a rasterization setup and rasterization unit, a depth comparison unit, a blending unit, and/or other units. GPUs may be used for graphics-intensive operations and/or compute-intensive workloads.

Graphics data may flow through a GPU in a pipeline fashion, performing steps outlined in one or more Application Programming Interfaces (APIs), such as OpenGL-ES, Vulkan, DirectX, or the like. Accordingly, the GPUs may conform to the standards specified, which may be directed to texture coordinates and texture address generation. More specifically, during a pixel shading stage in the pipeline, a shader program may make texture requests and receive filtered texture data.

In some modes, for each pixel, a directional derivative calculation may be performed in each of the X and Y dimensions to determine the minification or magnification of the texture being accessed with respect to the pixel (or sample) spacing of the coverage. In the context of this disclosure, the term "sample" and the term "pixel" may be used interchangeably insomuch as it is understood that the same operations are performed at either the pixel level or the sub-pixel sample level. Generally, reference will be made herein to pixels rather than samples.

Calculating a directional derivative may use at least two data values in each of the two dimensions. Thus, pixel shaders may operate on 2×2 quads (i.e., blocks of four pixels) as their minimum quantum of work. An input primitive may be a projection of a three-dimensional (3D) primitive onto a two-dimensional (2D) image-space, and rasterized to determine pixel coverage. A primitive may be a triangle defined by a triplet of (x,y) coordinate pairs. Regardless of the actual coverage formed by a given input primitive, work supplied to a parallel processor shader subsystem may be a collection of these 2×2 quads, which may result in a large inefficiency if many of the quads are only partially filled (i.e., partially covered).

One approach for reducing this inefficiency may involve recognizing cases of partial coverage, and transferring the coverage from one adjacent primitive to the quad of another. While this approach may reduce the total number of quads sent to the shader, and thus may help to reduce total energy consumption, such an approach comes at the expense of losing some image quality. The merging of quads may use certain heuristic thresholds applied and set to control its application, thereby attempting to avoid unwanted visual artifacts due to ascribing coverage from one primitive to an adjacent primitive, and as an approximation, using that adjacent primitive's attribute data. Nevertheless, such a quad merge approach remains lossy.

BRIEF SUMMARY

Various embodiments of the disclosure include a GPU, comprising one or more shader cores and a shader warp packer unit. The shader warp packer unit may be configured to receive a first primitive associated with a first partially covered quad, and a second primitive associated with a second partially covered quad. The shader warp packer unit may be configured to determine that the first partially covered quad and the second partially covered quad have non-overlapping coverage. The shader warp packer unit may be configured to pack the first partially covered quad and the second partially covered quad into a packed quad. The shader warp packer unit may be configured to send the packed quad to the one or more shader cores. In some embodiments, the first partially covered quad and the second partially covered quad are spatially disjoint from each other. The term disjoint may imply non-overlapping. The one or more shader cores may be configured to receive and process the packed quad with no loss of information relative to the one or more shader cores individually processing the first partially covered quad and the second partially covered quad.

A method for performing shader occupancy for small primitives using a GPU. The method may include receiving, by a shader warp packer unit, a first primitive associated with a first partially covered quad, and a second primitive associated with a second partially covered quad. The method may include determining, by the shader warp packer unit, that the first partially covered quad and the second partially covered quad have non-overlapping coverage. The method may include packing, by the shader warp packer unit, the first partially covered quad and the second partially covered quad into a packed quad. The method may include sending, by the shader warp packer unit, the packed quad to one or more shader cores. In some embodiments, the first partially covered quad and the second partially covered quad are spatially disjoint from each other. The term disjoint may imply non-overlapping. The method may include receiving and processing, by the one or more shader cores, the packed quad with no loss of information relative to the one or more shader cores individually processing the first partially covered quad and the second partially covered quad.

BRIEF DESCRIPTION OF THE DRAWINGS

The foregoing and additional features and advantages of the present disclosure will become more readily apparent from the following detailed description, made with reference to the accompanying figures, in which.

DETAILED DESCRIPTION

Figure 1A:
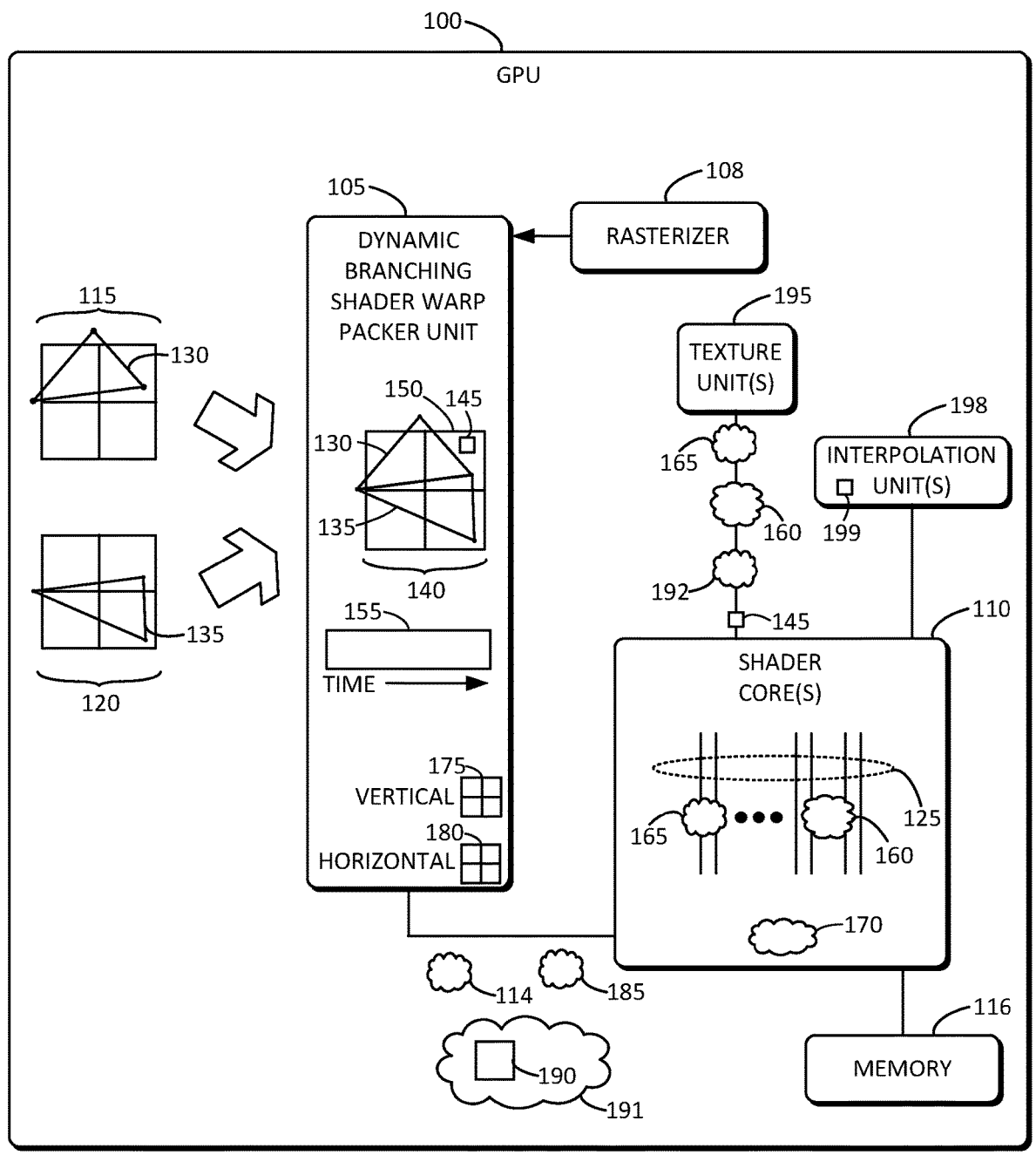
FIG. 1A illustrates a block diagram of a GPU including a dynamic branching pixel shader warp packer unit in accordance with some embodiments.

Reference will now be made in detail to embodiments disclosed herein, examples of which are illustrated in the accompanying drawings. In the following detailed description, numerous specific details are set forth to enable a thorough understanding of the inventive concept. It should be understood, however, that persons having ordinary skill in the art may practice the inventive concept without these specific details. In other instances, well-known methods, procedures, components, circuits, and networks have not been described in detail so as not to unnecessarily obscure aspects of the embodiments.

It will be understood that, although the terms first, second, etc. may be used herein to describe various elements, these elements should not be limited by these terms. These terms are only used to distinguish one element from another. For example, a first pixel could be termed a second pixel, and, similarly, a second pixel could be termed a first pixel, without departing from the scope of the inventive concept.

The terminology used in the description of the inventive concept herein is for the purpose of describing particular embodiments only and is not intended to be limiting of the inventive concept. As used in the description of the inventive concept and the appended claims, the singular forms "a", "an" and "the" are intended to include the plural forms as well, unless the context clearly indicates otherwise. It will also be understood that the term "and/or" as used herein refers to and encompasses any and all possible combinations of one or more of the associated listed items. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. The components and features of the drawings are not necessarily drawn to scale.

Some embodiments disclosed herein may include a technique for performing shader occupancy for relatively small primitives. In cases in which multiple primitives' coverage is placed into the same 2×2 quad, additional information may be packaged along with each pixel in the quad, thereby allowing for calculations that may be needed for directional derivative calculations. The technique may include full packing of quads from potentially separate primitives, along with auxiliary information that can be used to produce information that would have otherwise been produced by missing "helper" pixels or "H" pixels in the 2×2 quads, thereby increasing processing efficiency.

Some embodiments disclosed herein improve the efficiency of graphics-intensive operations within a GPU, which may involve the use of programmable units and/or fixed-function units within the GPU. Embodiments disclosed herein may not transfer coverage from one primitive to another, but instead, may provide mechanisms in which coverage from two or more primitives may exist in the same quad, without losing any precision. In addition, no associated heuristic thresholds are needed to maintain image quality. Additional information may be present, and calculations may occur, for the pixels within a quad that has coverage front more than one incoming primitive. Accordingly, small primitive processing efficiency may be improved. Moreover, the use of small and micro-polygons may be increased, thereby resulting in higher geometric complexity and fidelity, such as when used with graphic-intensive gaming applications.

Figure 1B:
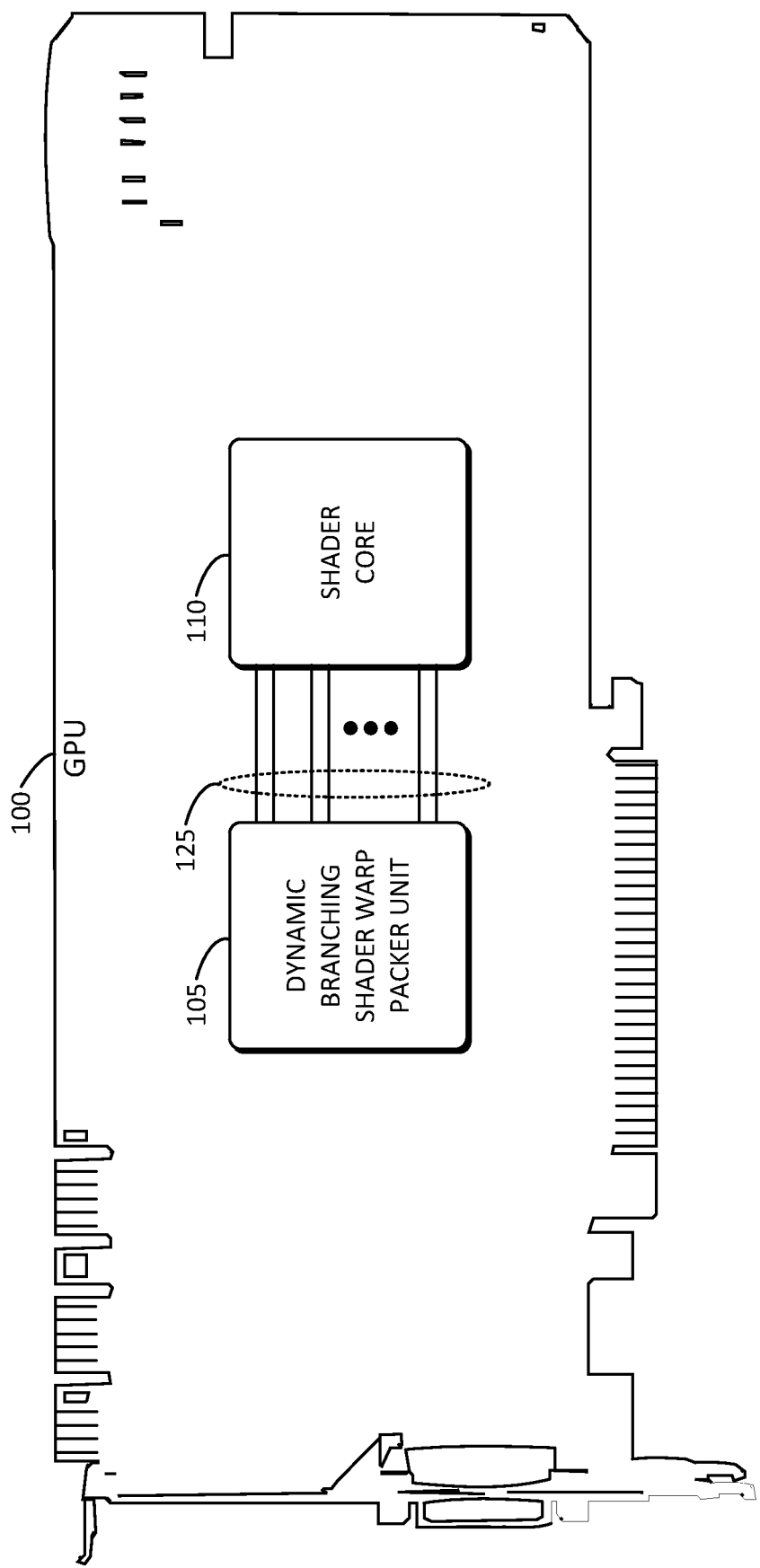
FIG. 1B illustrates a GPU including the dynamic branching pixel shader warp packer unit of FIG. 1A in accordance with some embodiments.
Figure 1C:
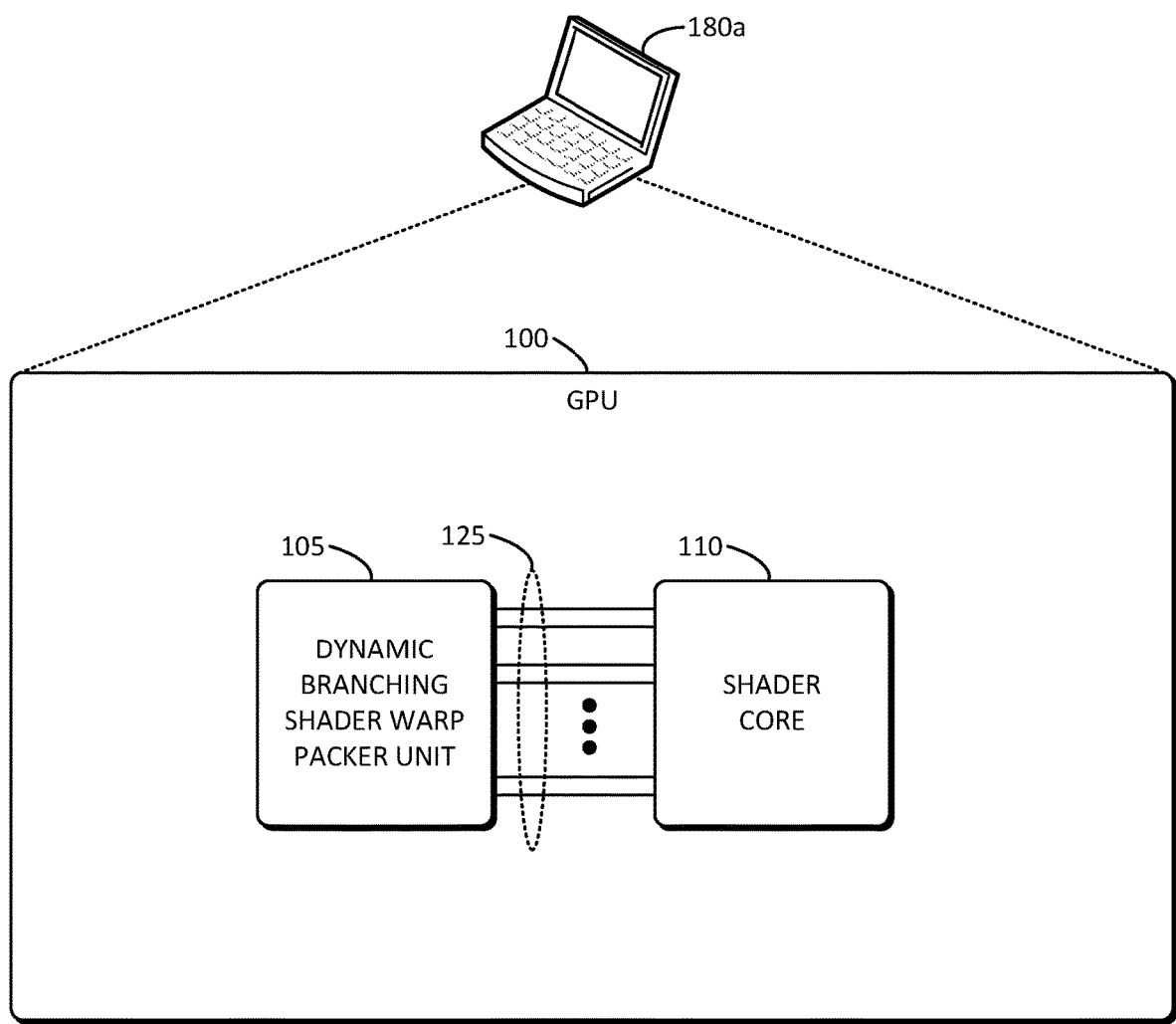
FIG. 1C illustrates a mobile personal computer including a GPU having the dynamic branching pixel shader warp packer unit of FIG. 1A in accordance with some embodiments.
Figure 1D:
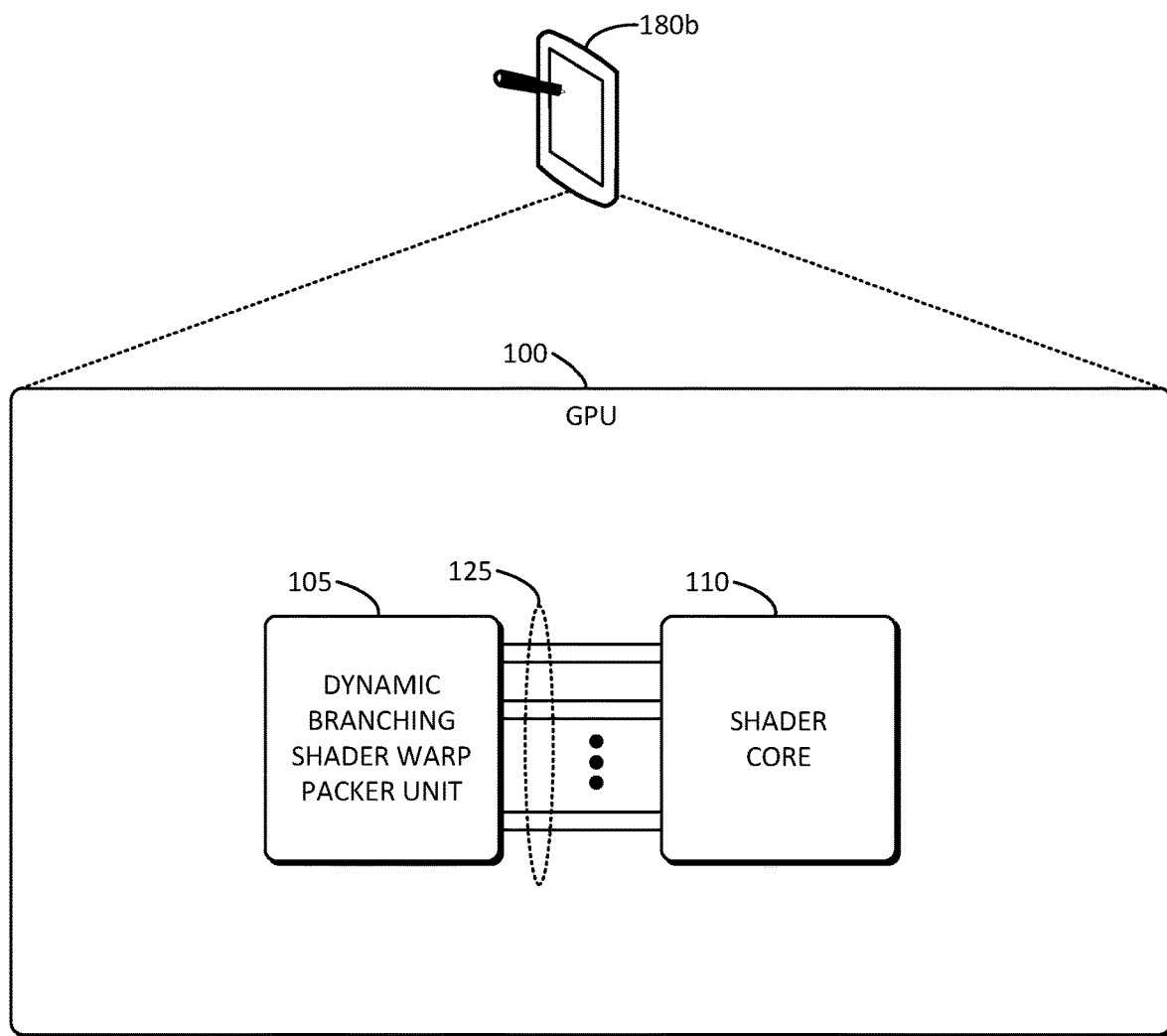
FIG. 1D illustrates a tablet computer including a GPU having the dynamic branching pixel shader warp packer unit of FIG. 1A in accordance with some embodiments.
Figure 1E:
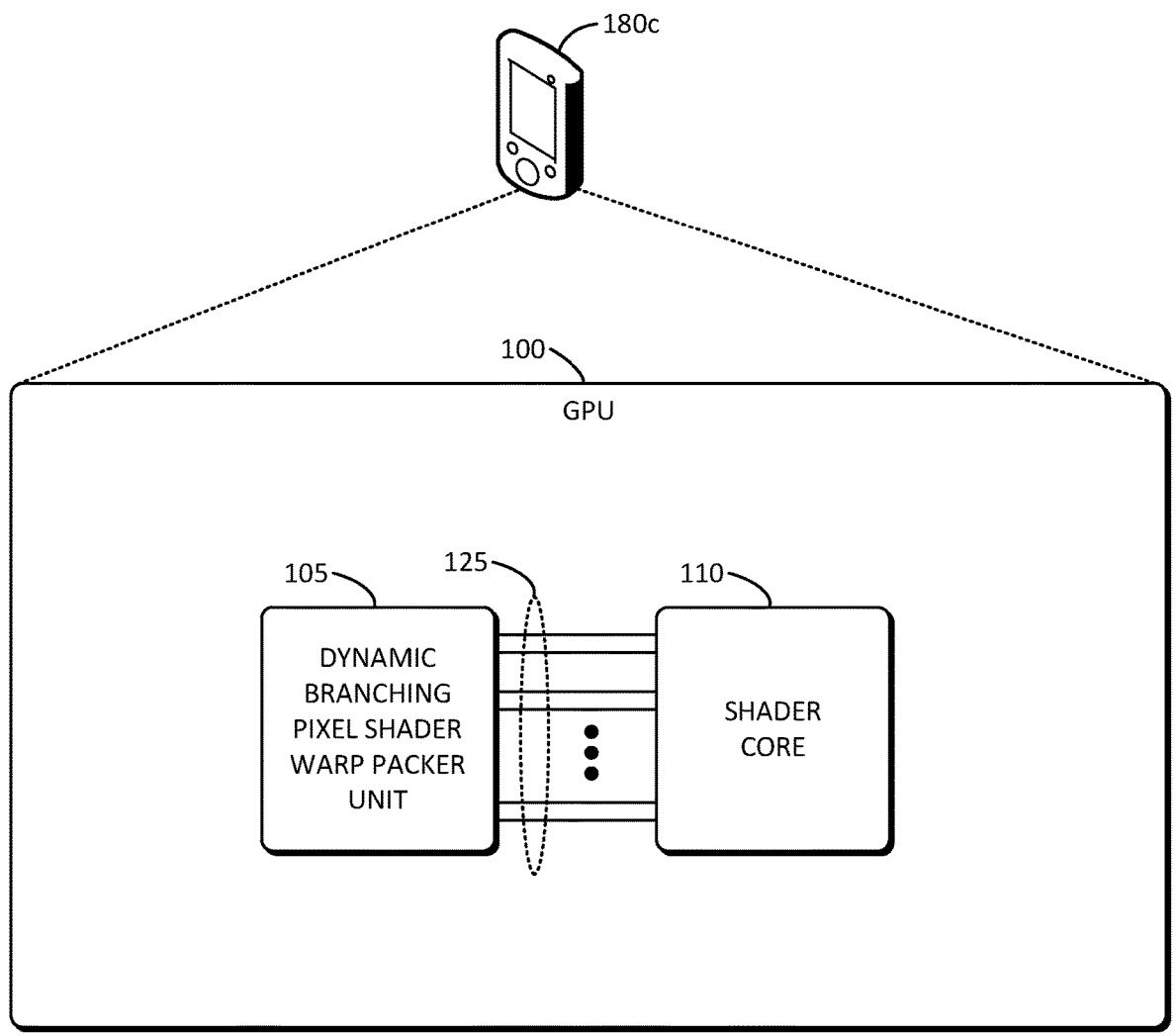
FIG. 1E illustrates a smart phone including a GPU having the dynamic branching pixel shader warp packer unit of FIG. 1A in accordance with some embodiments.

FIG. 1A illustrates a block diagram of a GPU 100 including a dynamic branching pixel shader warp packer unit 105 in accordance with some embodiments. FIG. 1B illustrates a GPU 100 including the dynamic branching pixel shader warp packer unit 105 of FIG. 1A in accordance with some embodiments. FIG. 1C illustrates a mobile personal computer 180a including a GPU 100 having the dynamic branching pixel shader warp packer unit 105 of FIG. 1A in accordance with some embodiments. FIG. 1D illustrates a tablet computer 180b including a GPU 100 having the dynamic branching pixel shader warp packer unit 105 of FIG. 1A in accordance with some embodiments. FIG. 1E illustrates a smart phone 180c including a GPU 100 having the dynamic branching pixel shader warp packer unit 105 of FIG. 1A in accordance with some embodiments. Reference is now made to FIGS. 1A through 1E.

The dynamic branching pixel shader warp packer unit 105 may perform shader occupancy for relatively small primitives 130, 135). In some embodiments, 2×2 quads such as quad 115 and quad 120 may each be only partially filled (i.e., partially covered). It will be understood that while reference is generally made herein to 2×2 quads, other sized quads can be used without departing from the inventive concept described. The small primitive 130 only partially fills the 2×2 quad 115. The small primitive 135 only partially fills the 2×2 quad 120. The dynamic branching pixel shader warp packer unit 105 may pack two or more primitives (e.g., 130, 135) into a same 2×2 quad 140. In cases in which multiple primitives' coverage is placed into the same 2×2 quad 140, additional attribute information (e.g., 145) may be packaged and/or stored along with each pixel (e.g., 150) in the 2×2 quad 140, thereby allowing for information that may be needed to calculate directional derivatives 160, 165, 192). The technique may include full packing of 2×2 quads from potentially separate primitives (e.g., 130, 135), along with the attribute information (e.g., 145), which can be used to produce information that would have otherwise been produced by missing H pixels in the 2×2 quads, thereby increasing processing efficiency.

Some embodiments disclosed herein improve the efficiency of graphics-intensive operations within the GPU 100, which may involve the use of programmable units and/or fixed-function units such as one or more shader core(s) 110 within the GPU 100. Embodiments disclosed herein may not transfer coverage from one primitive (e.g., 130) to another (e.g., 135), but instead, may provide mechanisms in which coverage from two or more primitives (e.g., 130, 135) may exist in the same 2×2 quad 140, without losing any precision. Additional attribute information (e.g., 145) may be present, and calculations may occur, for the pixels (e.g., 150) within the 2×2 quad 140, which may have coverage from more than one incoming primitive (e.g., 130, 135). Accordingly, small primitive processing efficiency may be improved. Moreover, the use of small and micro-polygons may be increased, thereby resulting in higher geometric complexity and fidelity, such as when used with graphic-intensive gaming applications.

When 2×2 quads (e.g., 115, 120) from two primitives (e.g., 130, 135) do not have overlapping coverage, then the dynamic branching pixel shader warp packer unit 105 may merge the 2×2 quads (e.g., 115, 120) from two different primitives (e.g., 130, 135) and place them within the same 2×2 quad 140. This leads to better warp occupancy. The dynamic branching pixel shader warp packer unit 105 may include a hysteresis window 155, which may collect non-overlapping quads (e.g., 115, 120) from various primitives (e.g., 130, 135). For example, within the hysteresis window 155, various primitives encountered (e.g., 130, 135) may be opportunistically combined into a single same 2×2 quad 140 for processing in the one or more shader cores 110, as further described below. Primitives that are candidates for shared quad processing but that fall beyond the hysteresis window 155 may be processed using conventional techniques, but would not get the benefit of improved shader efficiency. The non-overlapping coverage quality may not be required. In other words, the first partially covered quad 115 and the second partially covered quad 120 may have overlapping coverage, although at the cost of some additional buffering of data while pixels are processed in the one or more shader cores 110.

The dynamic branching shader warp packer unit 105 may receive one or more primitives (e.g., 130, 135), and determine whether at least two partially covered 2×2 quads (e.g., 115, 120) do not have overlapping coverage. According to embodiments disclosed herein, the at least two partially covered 2×2 quads (e.g., 115, 120) can be at a same location or a different location. Spatial proximity is not required. In other words, the partially covered 2×2 quads (e.g., 115, 120) need not be adjacent to each other, and the embodiments disclosed herein may be just as effective even if the partially covered 2×2 quads (e.g., 115, 120) are not in the same or similar location. The dynamic branching shader warp packer unit 105 may pack the at least two partially covered 2×2 quads (e.g., 115, 120) into a packed 2×2 quad (e.g., 140). The dynamic branching shader warp packer unit 105 may send the packed 2×2 quad (e.g., 140) to the one or more shader cores 110 for processing.

In addition, a compiler may be modified to generate a code sequence 170 to support a dynamic branching hybrid mode. The dynamic branching shader warp packer unit 105 may compute directional derivatives (e.g., 160, 165, 192) based on the code sequence 170 using one or more lanes 125. The one or more lanes 125 may be one or more computational threads, for example. The one or more lanes 125 may be processed, for example, by a multi-threaded and/or multi-core microprocessor. The compiler may generate the code sequence 170 to support cross-lane directional derivative computation (e.g., 160) and/or same-lane directional derivative computation (e.g., 165).

Multiple pixels may be piled up into the same lane. For example, the work associated with an H pixel may be mapped onto the same lane as a covered pixel. In some embodiments, H pixel data may be piled on to alive pixels. For example, one (1) or three (3) H pixels may be piled on to alive pixels. A compiler may generate code to compute the directional derivative within the same lane along side the code for cross-lane computation. A directional derivative (e.g., 160, 165, 192) may be computed in a cross-lane operation or a same-lane operation, A compiler can generate code for both approaches. The particular mode of operation (i.e., same-lane or cross-lane) can be chosen at run time using one or more flags 114, which may be generated and sent by the dynamic branching shader warp packer unit 105 as part of wave packing. The one or more flags 114 can be binary flags, for example.

The dynamic branching shader warp packer unit 105 may pass to the one or more shader cores 110 the packed warp 191 including the coverage map 190 having coverage for each of the 2×2 quads (e.g., 140) in a warp. The warp may have a power-of-two width, such as 16, 32, and 64, and so forth. The dynamic branching shader warp packer unit 105 may provide the one or more flags 114 to the one or more shader cores 110. The one or more flags 114 may be used to control (e.g., provide for a dynamic branch) in the one or more shader cores 110 code for a given pixel (e.g., 150), and thus collectively over four threads, for a given 2×2 quad (e.g., 140), Depending on the quad's coverage and the H pixels present (or not present), the one or more flags 114 may be used to control branches taken regarding the computation of the directional derivatives (e.g., 160, 165, 192). In other words, the compiler may generate the code segment 170 for different scenarios of computing the directional derivatives (e.g., 160, 165, 192) in each pixel, or across pixels, and may select branches among these cases dynamically as directed by the additional attribute information 145, which may be passed along with the 2×2 quad (e.g., 140) from the dynamic branching shader warp packer unit 105.

Responsive to control provided by the dynamic branching shader warp packer unit 105, the one or more shader cores (e.g., 110) and/or each of the lanes 125 can determine whether a horizontal directional derivative or a vertical directional derivative, or both, are computed in the same-lane (e.g., 165) or cross-lane (e.g., 160). This determination can be based on whether horizontal or vertical pixel neighbors in the 2×2 quad 140 are present, and/or based on information available to the dynamic branching pixel shader warp packer unit 105. Accordingly, the dynamic branching pixel shader warp packer unit 105 may generate two bit-masks (e.g., 175, 180), one for each direction. In other words, the dynamic branching pixel shader warp packer unit 105 may generate a bitmask 175 for the vertical direction, and a bitmask 180 for the horizontal direction. The dynamic branching pixel shader warp packer unit 105 may use knowledge of the quad coverage from a primitive to make this determination. Each of the bitmasks (e.g., 175, 180) may include 1 bit per pixel.

Primitives may be rasterized in multiples of a 2×2 quad. One or more 2×2 quads may be packed together into pixel shader warps, which may be sent to the one or more shader cores 110 for execution. Calculating a directional derivative (e.g., 160, 165, 192) may use at least two data values in each of two dimensions. Accordingly, pixels in a 2×2 quad may be used to compute directional derivatives. This directional derivative may be useful in computing a particular level-of-detail (LOD), which may be used in a variety of ways, including determining a mip-level of a texture.

In some embodiments, 2×2 quads may also help to reduce texture traffic by exploiting spatial locality between pixels in a 2×2 quad. Accordingly, the GPU 100 may schedule a 2×2 quad into the one or more pixel shader cores 110 even when not all pixels inside the 2×2 quad are occupied. Pixels which are not visible but are used only for the purposes of computing the directional derivative (e.g., 160, 165, 192) may be referred to as H pixels. When the majority of primitives is large, then so too is the majority of 2×2 quads that are fully-filled. Stated differently, embodiments disclosed herein are more important when the majority of the primitives is not large. In some embodiments, large may be defined as covering 10s or 100s of 2×2 quads. The larger a primitive, the smaller the fraction of partially-covered 2×2 quads there are compared to fully-covered (by that primitive) 2×2 quads.

However, when a frame is dominated by micro-polygons (e.g., when a primitive occupies less than a 2×2 quad of pixels), then the lack of full coverage in the 2×2 quad may lead to inefficient GPU shader code utilization. This may also be true for small (but not micro) polygons. Even if the primitives, which are usually triangles, cover two or several 2×2 quads, there may still be a significant percentage of partially-covered 2×2 quads just as a consequence of being triangles rather than rectangular primitives. Embodiments disclosed herein are advantageous for both small and micro primitives.

To address this performance problem, the dynamic branching pixel shader warp packer unit 105 may independently schedule a pixel. This may be made possible by assigning attributes of neighboring pixels in the X and Y directions to the same the pixel. The directional derivative (e.g., 160, 165, 192) may be fully computed in a same-lane operation instead of a cross-lane operation. In an architecture that uses barycentric factors for interpolating the attributes (e.g., at every sample) this can be achieved by copying the barycentric factors 185 of neighboring pixels in the horizontal and vertical directions of a 2×2 quad. In other words, each pixel may now contain three sets of barycentric factors 185: i) one for itself; ii) one for a neighboring pixel along the horizontal direction; and iii) one for a neighboring pixel along the vertical direction. The barycentric factors 185 may be used to compute the attributes for the directional derivative (e.g., 160, 165, 192). This technique may increase register pressure because four additional values may be stored per lane. However, for each set of barycentric factors 185, it is sufficient to store just two of them, while the third value can be computed by subtracting the sum of the two barycentric factors 185 from one (1).

When a pixel (e.g., 150) used for computing a directional derivative (e.g., 160, 165, 192) is part of the primitive's coverage, then the dynamic branching pixel shader warp packer unit 105 need not copy barycentric factors (e.g., 185) of that pixel, and the dynamic branching pixel shader warp packer unit 105 may use cross-lane operations to compute the directional derivative (e.g., 160). When a pixel (e.g., 150) used for computing the directional derivative is not part of a primitive's coverage, then the dynamic branching pixel shader warp packer unit 105 may use single-lane operations to compute the directional derivative (e.g., 165), In this case, the barycentric factors 185, one or more flags 114, and/or a packed warp 191 having a coverage map 190 of the 2×2 quad 140 may be sent to the one or more shader cores 110. The one or more shader cores 110 may use the coverage map 190 to determine whether the horizontal and/or vertical derivatives are computed in a same-lane operation or a cross-lane operation. The one or more shader cores 110 may employ dynamic branching to use either of these paths. Alternatively or in addition, a separate code entry point into a shader program may be provided, which may be preferable if it saves latency and energy associated with executing a dynamic branch instruction. In other words, the dynamic branch may be "performed" external to the shader program by having the program start from different entry points responsive to the coverage map 190 and/or other parameters.

Instead of sending barycentric factors 185, partial differentials 192 may be sent to the one or more shader cores 110, as further described below. The GPU 100 may include a memory 116 to store the directional derivatives. The memory 116 may be a volatile or non-volatile memory or other suitable storage device.

The GPU 100 may include one or more texture units 195. Calculation of the LOD can be performed either in the one or more shader cores 110 or in the one or more texture units 195. When the LOD is implemented outside of the one or more shader cores 110 and performed in the one or more texture units 195, then the additional attribute data (e.g., 145) may be sent from the one or more shader cores 110 to the one or more texture units 195 and/or minor modifications made to the one or more texture units 195. The one or more shader cores 110 may be aware of sample instructions and/or texture operations that may be occurring, and therefore may have access to other texture coordinate information to provide to the one or more texture units 195.

The GPU 100 may include one or more interpolation units 198. Interpolation of the attributes (e.g., 145) can be done using barycentric factors 185 and/or can be performed by the one or more interpolation units 198 using plane equations. In such a case, additional modification to the one or more interpolation units 198 may perform attribute interpolations for H pixels. Further, a map 199 indicating which H pixels may be present and which attributes may be associated with each H pixel may be used by the one or more interpolation units 198.

Figure 2:
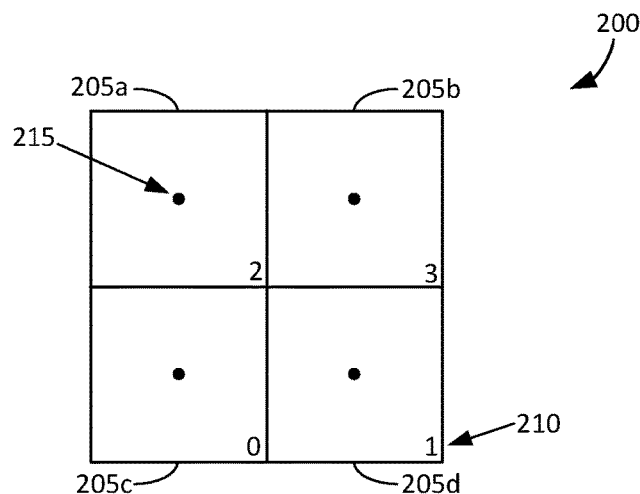
FIG. 2 is a block diagram showing a 2×2 quad in accordance with some embodiments.

FIG. 2 is a block diagram showing a 2×2 quad 200 in accordance with some embodiments. The 2×2 quad 200 may include four pixels 205a, 205b, 205c, and 205d. Each of the pixels may have a center point (e.g., 215). Each of the pixels may have a pixel number (e.g., 210).

Figure 3:
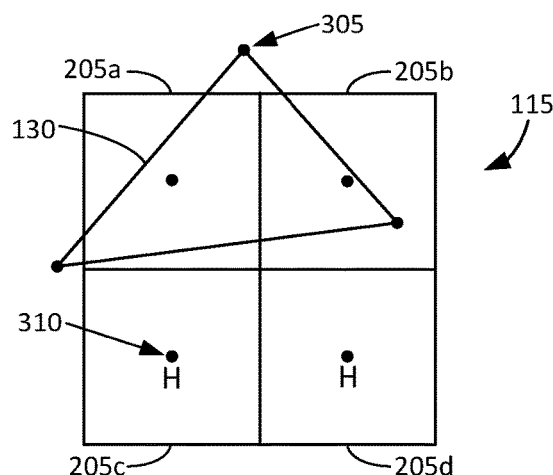
FIG. 3 is a block diagram showing a primitive in a partially-covered 2×2 quad in accordance with some embodiments.
Figure 4:
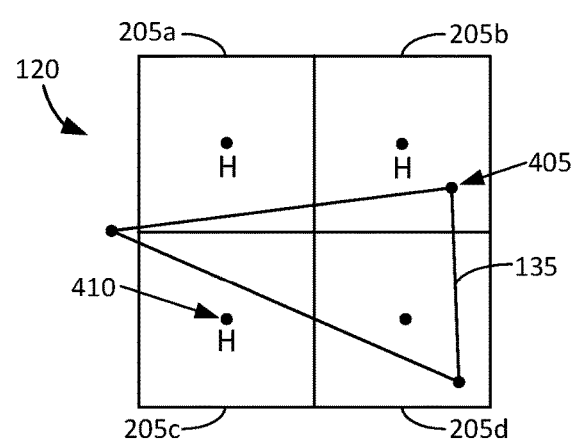
FIG. 4 is a block diagram showing another primitive in another partially-covered 2×2 quad in accordance with some embodiments.

FIG. 3 is a block diagram showing the primitive 130 in a partially-covered 2×2 quad 115 in accordance with some embodiments. FIG. 4 is a block diagram showing the primitive 135 in another partially-covered 2×2 quad 120 in accordance with some embodiments. Reference is now made to FIGS. 1A, 3, and 4.

The 2×2 quad 115 may be filled based on the coverage of arriving primitives. The primitives 130 and 135 may each contribute coverage to a same 2×2 quad 140. The primitives 130 and 135 may each include three vertices (e.g., 305, 405). Conventionally, the 2×2 quad 115 and the 2×2 quad 120 would both need to be individually sent to the one or more shader cores 110. The 2×2 quad 115 would be sent having two upper pixels covered by the primitive 130, and two H pixels (e.g., 310) used for directional derivative calculations. The 2×2 quad 120 would be separately sent having one lower pixel covered by the primitive 135, and three H pixels (e.g., 410) used for directional derivative calculations. Thus, although only three pixels are covered in the 2×2 quads 115 and 120, a total of eight (8) threads would be allocated in the one or more shader cores 110—one for each pixel of each 2×2 quad.

Figure 5:
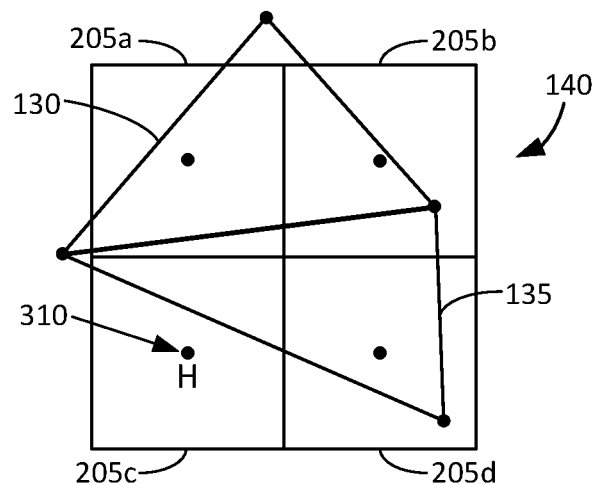
FIG. 5 is a block diagram showing a packed 2×2 quad in accordance with some embodiments.

FIG. 5 is a block diagram showing a packed 2×2 quad 140 in accordance with some embodiments. According to embodiments disclosed herein, H pixels need not be used when the coverage belongs to another adjacent primitive (e.g., 130, 135). For example, as shown in FIG. 5, the primitives 130 and 135 are present in the 2×2 quad 140, and thus only the primitive 130 can have sufficient coverage along with the associated H pixel 310 to provide for directional derivative calculations. However, the primitive 135 has only a single pixel (i.e., 205d) of coverage and no associated H pixels in the 2×2 quad 140. The pixel 205d corresponding to the primitive 135's coverage may be marked as needing two H pixel's worth of additional attribute information (e.g., 145) and/or attribute evaluation by the one or more shader cores 110.

Conventionally, each of the primitives (e.g., 130, 135) would have required all four (4) pixels be sent to the one or more shader cores 110, for a total of eight (8) pixels. Using embodiments disclosed herein, only three (3) or four (4) pixels may be sent to the one or more shader cores 110 rather than eight (8) pixels, while still achieving a completely lossless result.

Figure 6:
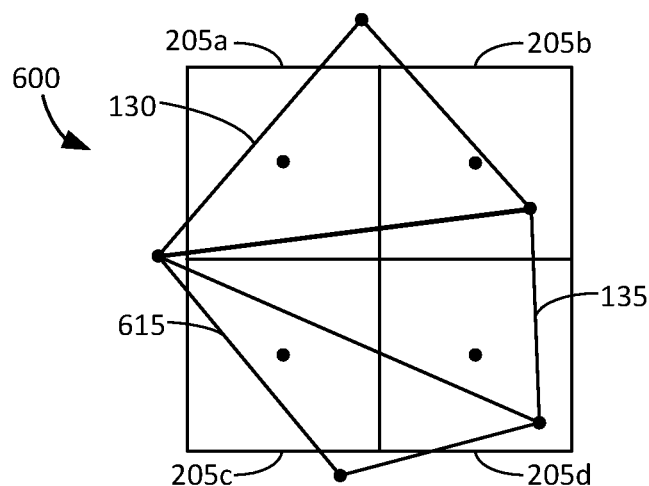
FIG. 6 is a block diagram showing another packed 2×2 quad in accordance with some embodiments.

FIG. 6 is a block diagram showing another packed 2×2 quad 600 in accordance with some embodiments. In this example embodiment, there are three primitives (e.g., 130, 135, and 615) that are present with coverage in the same 2×2 quad 600, and the primitives (e.g., 130, 135, and 615) may not have sufficient pixels in the 2×2 quad 600 for directional derivative calculations to be performed across lanes. Consequently, at least some additional attribute calculations based on the attribute information 145 associated with each pixel of the 2×2 quad 600 may be performed for one or more adjacent pixels. The bitmasks (e.g., 175, 180) may be used to indicate for each of the pixels in the 2×2 quad 600 which neighboring pixels are or are not present for a given primitive (e.g., 130, 135, and 615). This enables the one or more shader cores 110 and/or the one or more texture units 195 to compute the directional derivatives based on the bitmasks (e.g., 175, 180) and/or based on the additional attribute information (e.g., 145).

Thus for the primitive 130, which has horizontally adjacent coverage in the 2×2 quad 600, the horizontal directional derivative calculation may be computed using conventional technology whereas the vertical directional derivative may be computed using an embodiment disclosed herein. The result is the denser packing, as described above, while no unnecessary additional work is placed on a given pixel when there is a neighboring pixel of the same primitive available for the directional derivative calculation. The overloading of additional work may only be present when a covered pixel or helper pixel is not available, the hater due to the particular pixel position being occupied by another primitive with coverage in the same 2×2 quad.

Conventionally, each of the primitives (e.g., 130, 135, and 615) would have required all four (4) pixels be sent to the one or more shader cores 110, for a total of twelve (12) pixels. Using embodiments disclosed herein, only four (4) pixels may be sent to the one or more shader cores 110 rather than twelve (12) pixels, while still achieving a completely lossless result.

Some application programming interfaces (APIs) of GPUS have specific rules about the operations that should and should not be performed for the H pixels that may be present in quads that do not have complete primitive coverage. Specifically, for example, the APIs may, specify that the H pixels should not perform any side-effects, such as reads, writes, or atomic accesses to memory. The APIs may also specify that the H pixels should not write any data to render targets, sometimes referred to as "attachments" by some APIs. According to embodiments disclosed herein, such API restrictions are not problematic, and may even be convenient, because they lessen the burden on the compiler regarding the additional code needed for pixels in a quad that do not also have a vertical and/or a horizontal H pixel or actual pixel present.

Barycentric evaluations for attributes may be provided. Regardless of whether the embodiments disclosed herein are invoked, for each pixel sent to the one or more shader cores 110 for processing, post front-end transformation, application-provided attributes may be interpolated to the pixel's location. This may take the form of interpolating a barycentric coordinate pair and using that as the basis for evaluating each of the primitives' attributes at each of the pixel locations. In some embodiments, this evaluation of attributes may be augmented to include the evaluation of the pixel's attributes and also that of one or two immediately adjacent pixels, to serve as directional derivative texture input.

Reference is now made to FIGS. 1A through 7.

Instead of sending barycentric factors 185, partial differentials 192 may be sent to the one or more shader cores 110, which may be used to compute the directional derivatives (e.g., 160, 165, 192). For example, the directional derivatives (e.g., 160, 165, 192) may be determined as follows:

$(x_0,y_0)$, $(x_1,y_1)$, $(x_2,y_2)$ may be the three vertices (e.g., 305, 405, . . . ) of a primitive in screen space. A may be the total area of the primitive (e.g., 130, 135).

Let u, v, w be the three barycentric factors 185 of a point inside the primitive (e.g., 130, 135), thus u+v+w=1.0.

The one or more shader cores 110 and/or the one or more texture units 195 may compute the barycentric factors 185 of the horizontal and vertical pixel neighbors using the following relationships:

$$u_{x-1,y} = u_{x,y} - \frac{y_2}{A} + \frac{y_0}{A} = u_{x,y} - \frac{\partial u}{\partial x}$$

$$u_{x+1,y} = u_{x,y} + \frac{y_2}{A} - \frac{y_0}{A} = u_{x,y} + \frac{\partial u}{\partial x}$$

$$u_{x,y-1} = u_{x,y} - \frac{x_2}{A} + \frac{x_0}{A} = u_{x,y} - \frac{\partial u}{\partial y}$$

$$u_{x,y+1} = u_{x,y} + \frac{x_2}{A} - \frac{x_0}{A} = u_{x,y} + \frac{\partial u}{\partial y}$$

$$v_{x-1,y} = v_{x,y} - \frac{y_1}{A} + \frac{y_0}{A} = v_{x,y} - \frac{\partial v}{\partial x}$$

$$v_{x+1,y} = v_{x,y} + \frac{y_1}{A} - \frac{y_0}{A} = v_{x,y} + \frac{\partial v}{\partial x}$$

$$v_{x,y-1} = v_{x,y} - \frac{x_1}{A} + \frac{x_0}{A} = v_{x,y} - \frac{\partial v}{\partial y}$$

$$v_{x,y+1} = v_{x,y} + \frac{x_1}{A} - \frac{x_0}{A} = v_{x,y} + \frac{\partial v}{\partial y}$$

The partial differentials 192 can be supplied to the one or more shader cores 110, and the one or more shader cores 110 and/or the one or more texture units 195 can compute the barycentric factors 185 of the neighboring pixels to compute the directional derivative (e.g., 160, 165, 192).

Alternatively, the partial differentials 192 can be used to directly compute the directional derivative (e.g., 160, 165, 192). As an example, the computation for one value is shown below. The same technique can be applied to all attributes. As is evident from the derivation below, the directional derivative (e.g., 160, 165, 192) can be computed using two multiplications and one addition, assuming $(t_0-t_2)$ and $(t_1-t_2)$ have already been computed.

$$t_{x,y} - t_{x-1,y} = \{u_{x,y} \times t_0 + v_{x,y} \times t_1 + (1 - u_{x,y} - v_{x,y}) \times t_2\} -$$
$$\{u_{x-1,y} \times t_0 + v_{x-1,y} \times t_1 + (1 - u_{x-1,y} - v_{x-1,y}) \times t_2\} =$$
$$\{u_{x,y} \times (t_0 - t_2) + v_{x,y} \times (t_1 - t_2) + t_2\} -$$
$$\{u_{x-1,y} \times (t_0 - t_2) + v_{x-1,y} \times (t_1 - t_2) + t_2\} =$$
$$\{(u_{x,y} - u_{x-1,y}) \times (t_0 - t_2)\} + \{(v_{x,y} - v_{x-1,y}) \times (t_1 - t_2)\} =$$
$$\frac{\partial u}{\partial x}(t_0 - t_2) + \frac{\partial v}{\partial x}(t_1 - t_2)$$

Sending the barycentric factors 185 and partial differentials 192 may incur the same cost in terms of registers, e.g., four registers. In the former case, computation of the directional derivative (e.g., 160, 165, 192) may incur a cost of two subtractions, two multiplications and one addition, assuming $(t_0-t_2)$ and $(t_1-t_2)$ have already been computed. The latter may involve just two multiplications and one addition since the partial differentials 192 may already be available.

Figure 7:
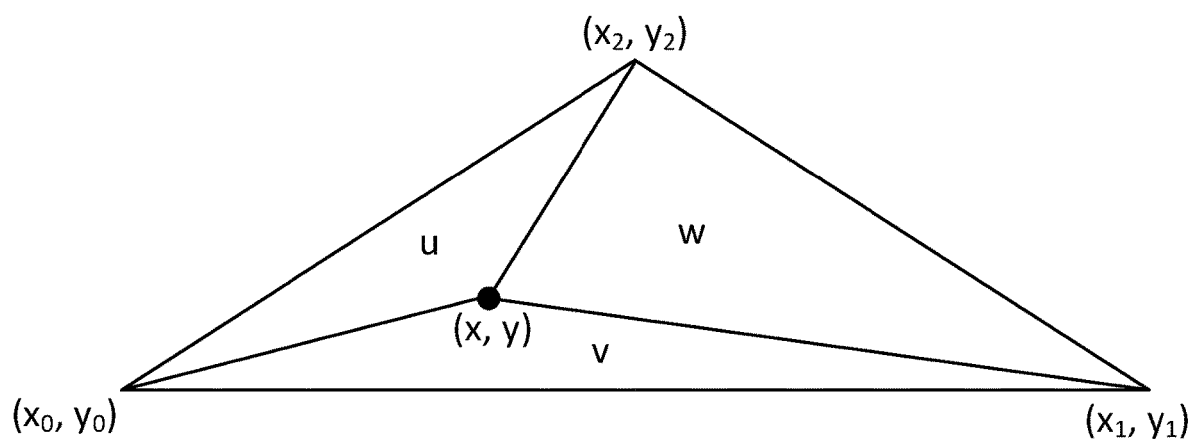
FIG. 7 is a diagram associated with batycentric factor computation of neighboring pixels expressed relative to a pixel at (x,y).

FIG. 7 is a diagram associated with barycentric factor computation of neighboring pixels expressed relative to a pixel at (x,y). The figures may be expressed in equations as follows:

$$u_{x,y} = \frac{(x_0 - x_2)(y - y_0) - (x - x_0)(y_0 - y_2)}{2 \cdot A}$$
$$v_{x,y} = \frac{(x_0 - x)(y_1 - y_0) - (y_0 - y)(x_1 - x_0)}{2 \cdot A}$$

In some embodiments, the following table 1 shows a barycentric factor computation of neighboring pixels expressed relative to the pixel at (x,y):

TABLE 1

| Position | U | V |
| --- | --- | --- |
| (x − 1, y) | $u_{x,y} + \frac{(y_0 - y_2)}{2 \cdot A}$ | $v_{x,y} + \frac{(y_1 - y_0)}{2 \cdot A}$ |
| (x, y − 1) | $u_{x,y} - \frac{(x_0 - x_2)}{2 \cdot A}$ | $v_{x,y} - \frac{(x_1 - x_0)}{2 \cdot A}$ |
| (x + 1, y) | $u_{x,y} - \frac{(y_0 - y_2)}{2 \cdot A}$ | $v_{x,y} - \frac{(y_1 - y_0)}{2 \cdot A}$ |
| (x, y + 1) | $u_{x,y} + \frac{(x_0 - x_2)}{2 \cdot A}$ | $v_{x,y} + \frac{(x_1 - x_0)}{2 \cdot A}$ |
| (x + 1, y + 1) | $u_{x,y} - \frac{(y_0 - y_2)}{2 \cdot A} + \frac{(x_0 - x_2)}{2 \cdot A}$ | $v_{x,y} - \frac{(y_1 - y_0)}{2 \cdot A} + \frac{(x_1 - x_0)}{2 \cdot A}$ |

Let (s,t) be the attributes that need interpolation. To interpolate these attributes at some pixel location (x,y), each attribute's value given by $(s_0,t_0)$, $(s_1,t_1)$, $(s_2,t_2)$ at each of the three vertices, may be combined with the barycentric factors for this pixel as follows.

$$s_{x,y} = s_0 \cdot u_{x,y} + s_1 \cdot v_{x,y} + s_2 \cdot (1 - u_{x,y} - v_{x,y})$$

$$t_{x,y} = t_0 \cdot u_{x,y} + t_1 \cdot v_{x,y} + t_2 \cdot (1 - u_{x,y} - v_{x,y})$$

Combining the equation above with expressions in Table 1, the attribute calculation of neighboring pixels can be expressed as given below.

$$t_{x,y} - t_{x-1,y} = \{u_{x,y} \cdot t_0 + v_{x,y} \cdot t_1 + (1 - u_{x,y} - v_{x,y}) \cdot t_2\} -$$
$$(u_{x-1,y} \cdot t_0 + v_{x-1,y} \cdot t_1 + (1 - u_{x-1,y} - v_{x-1,y}) \cdot t_2) =$$
$$\{u_{x,y} \cdot (t_0 - t_2) + v_{x,y} \cdot (t_1 - t_2) + t_2\} -$$
$$\{u_{x-1,y} \cdot (t_0 - t_2) + v_{x-1,y} \cdot (t_1 - t_2) + t_2\} =$$
$$\{(u_{x,y} - u_{x-1,y}) \cdot (t_0 - t_2)\} + \{(v_{x,y} - v_{x-1,y}) \cdot (t_1 - t_2)\} =$$
$$\left\{\frac{(y_0 - y_2)}{2 \cdot A} \cdot (t_0 - t_2)\right\} + \left\{\frac{(y_1 - y_0)}{2 \cdot A} \cdot (t_1 - t_2)\right\}$$

In some embodiments, the following table 2 shows directional derivative computation given the values at the three corners of the triangle (i.e., primitive):

TABLE 2

| Direction | Directional Derivative Calculation |
| --- | --- |
| X | $\left\{\frac{(y_0 - y_2)}{2 \cdot A} \cdot (t_0 - t_2)\right\} + \left\{\frac{(y_1 - y_0)}{2 \cdot A} \cdot (t_1 - t_2)\right\}$ |
| Y | $-\left\{\frac{(x_0 - x_2)}{2 \cdot A} \cdot (t_0 - t_2)\right\} - \left\{\frac{(x_1 - x_0)}{2 \cdot A} \cdot (t_1 - t_2)\right\}$ |

The values $$\frac{(y_0 - y_2)}{2 \cdot A}, \frac{(y_1 - y_0)}{2 \cdot A}, \frac{(x_0 - x_2)}{2 \cdot A}, \frac{(x_1 - x_0)}{2 \cdot A}$$

may already be available with a barycentric interpolation (BCI) unit of a GPU. Such pre-existing data can be copied to a vector register file, and then the calculations above may be reduced to four (4) multiplications and four (4) additions (or subtractions).

Even if the above-referenced four values are unavailable, the BCI may copy the value of $$\frac{1}{2 \cdot A}$$

to a register, and then the number of operations may be reduced to four (4) multiplications and eight (8) additions (or subtractions). Both alternatives may involve allocating an additional four registers to store additional values.

In cases with multiple, small triangles, considerable performance improvement may be achieved based on the implementation of the embodiments disclosed herein. For micro-polygons (i.e., those covering only a single sample), the embodiments disclosed herein may bring the shader rate more in line with the primitive setup rate. The embodiments disclosed herein do not require a massive redesign of the GPU pipeline. Some changes may be made in the pixel packing logic, and some additional software-accessible data may be provided to the shader core for pixel shaders. The techniques disclosed herein are completely lossless. Unlike conventional technologies, there is no change in the visual or numerical results, and thus no need for a heuristic of when applying these techniques may be aesthetically acceptable.

In addition, the embodiments disclosed herein may be completely transparent to applications. In other words, applications that run on the GPU 100 need not be changed to receive the benefits of the embodiments disclosed herein. Total latency for a given warp may grow in cases when multiple primitives' coverage may be packed in the same quad, but this is more than offset by other savings.

There may be a break-even point at which the calculations of the H pixels is best computed using explicit threads. There are a few factors which could influence disabling embodiments disclosed herein. Some of the factors include the following. First, the sum of the additional instructions used for interpolating the attributes is more than the threshold of the total number of instructions executed by the one or more shader cores 110. Essentially, the cost of interpolating additional attributes may be relatively high such that packing more threads does not benefit the overall performance. Second, the number of texture accesses needed for the directional derivatives may be more than a certain threshold. In such cases, it may be better to disable embodiments disclosed herein, and instead perform calculations using conventional techniques. However, the trend is towards more complicated pixel shaders, requiring more calculations per thread. The compiler may statically analyze the shader program to determine if it's worth packing multiple primitives into a quad, and if so, set a flag or some other state variable to enable embodiments disclosed herein. In other words, it may be beneficial to switch off the disclosed techniques when the overhead of the disclosed techniques exceeds the benefits. A pixel may be marked as an H pixel, which can be used to indicate where these lanes need to be switched on and where these lanes need to be switched off to avoid unproductive work.

Figure 8:
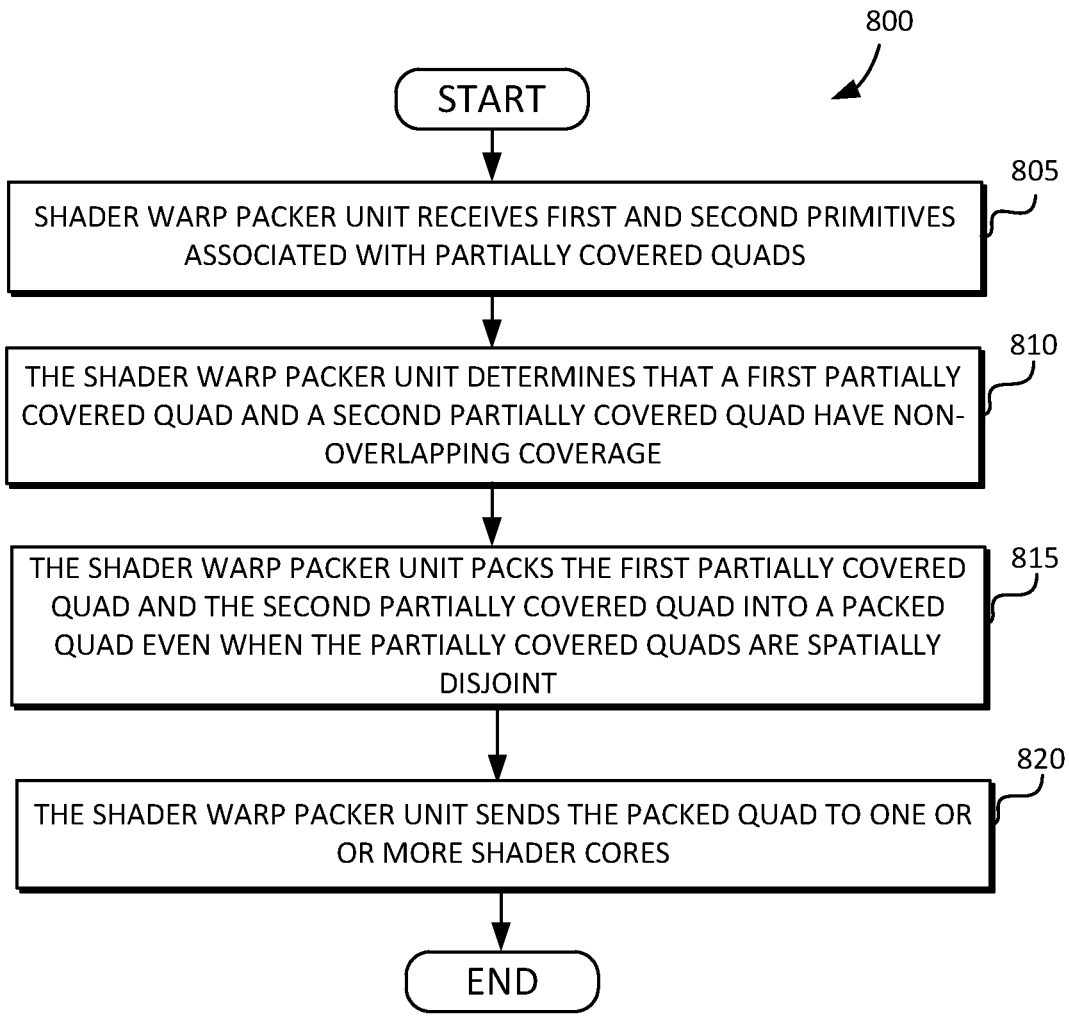
FIG. 8 is a flow diagram illustrating a technique for performing shader occupancy for small primitives in accordance with some embodiments.

FIG. 8 is a flow diagram 800 illustrating a technique for performing shader occupancy for small primitives in accordance with some embodiments. At 805, a shader warp packer unit may receive a first primitive associated with a first partially covered quad, and a second primitive associated with a second partially covered quad. At 810, the shader warp packer unit may determine that the first partially covered quad and the second partially covered quad have non-overlapping coverage. At 815, the shader warp packer unit may pack the first partially covered quad and the second partially covered quad into a packed quad even when the first partially covered quad and the second partially covered quad are spatially disjoint. The term disjoint may imply non-overlapping. At 820, the shader warp packer unit may send the packed quad to one or more shader cores.

Figure 9:
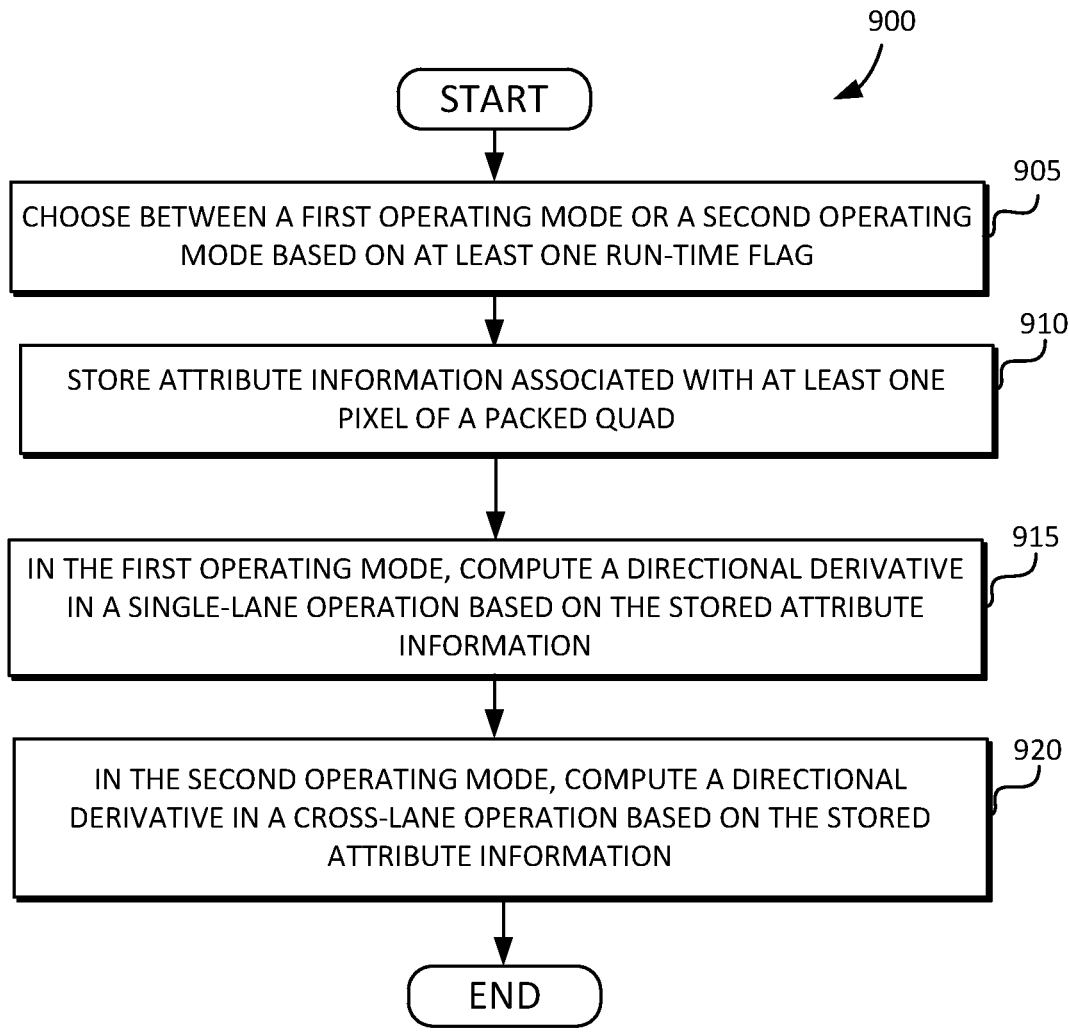
FIG. 9 is a flow diagram illustrating another technique for performing shader occupancy for small primitives in accordance with some embodiments.

FIG. 9 is a flow diagram 900 illustrating another technique for performing shader occupancy for small primitives in accordance with some embodiments. At 905, the shader warp packer unit or the one or more shader cores may choose between a first operating mode or a second operating mode based on at least one run-time flag. At 910, the shader warp packer unit or the one or more shader cores may store attribute information associated with at least one pixel of a packed quad. At 915, in the first operating mode, a directional derivative may be computed in a single-lane operation based on the stored attribute information. At 920, in the second operating mode, a directional derivative may be computed in a cross-lane operation based on the stored attribute information.

It will be understood that the steps of FIGS. 8 and 9 need not be performed in the order shown, and intervening steps may be present.

In some embodiments, a GPU includes one or more shader cores. The GPU may include a shader warp packer unit configured to receive a first primitive associated with a first partially covered quad, and a second primitive associated with a second partially covered quad. In some embodiments, the shader warp packer unit is configured to determine that the first partially covered quad and the second partially covered quad have non-overlapping coverage. In some embodiments, the shader warp packer unit is configured to pack the first partially covered quad and the second partially covered quad into a packed quad. In some embodiments, the shader warp packer unit is configured to send the packed quad to the one or more shader cores. In some embodiments, the first partially covered quad and the second partially covered quad are spatially disjoint from each other. The term disjoint may imply non-overlapping.

In some embodiments, the one or more shader cores are configured to receive and process the packed quad with no loss of information relative to the one or more shader cores individually processing the first partially covered quad and the second partially covered quad. In some embodiments, the shader warp packer unit is configured to assign zero or more pixels from the packed quad to a single lane for a single-lane operation. For example, a single "coverage" pixel may be assigned to a lane, and then zero, one, or two H pixels may be assigned to the same lane. In some embodiments, the shader warp packer unit is configured to cause the shader core(s) to compute a directional derivative in the single-lane operation. In some embodiments, the one or more shader cores are configured to compute a directional derivative in the single-lane operation.

The GPU may include a first operating mode in which at least one of i) the one or more texture units, or ii) the one or more shader cores are configured to compute the directional derivative in the single-lane operation. The GPU may include a second operating mode in which at least one of i) the one or more texture units, or ii) the one or more shader cores are configured to compute a second directional derivative in a cross-lane operation.

In some embodiments, the at least one of i) the shader warp packer unit or ii) the one or more shader cores are configured to choose at least one of the first operating mode or the second operating mode based on at least one run-time flag. In some embodiments, the shader warp packer unit is configured to store attribute information associated with at least one pixel of the packed quad. In some embodiments, at least one of i) the one or more texture units, or ii) the one or more shader cores are configured to compute a directional derivative based on the attribute information. In some embodiments, at least one of i) the one or more texture units, or ii) the one or more shader cores are configured to compute a directional derivative based on one or more barycentric factors. In some embodiments, at least one of i) the one or more texture units, or ii) the one or more shader cores are configured to compute a directional derivative based on one or more partial differentials.

In some embodiments, at least one of i) the one or more texture units or ii) the one or more shader cores are configured to compute a first directional derivative in an X direction according to:

$$\left\{\frac{(y_0 - y_2)}{2 \cdot A} \cdot (t_0 - t_2)\right\} + \left\{\frac{(y_1 - y_0)}{2 \cdot A} \cdot (t_1 - t_2)\right\};$$

and at least one of i) the one or more texture units or ii) the one or more shader cores are configured to compute a second directional derivative in a Y direction according to:

$$-\left\{\frac{(x_0-x_2)}{2\cdot A}\cdot(t_0-t_2)\right\}-\left\{\frac{(x_1-x_0)}{2\cdot A}\cdot(t_1-t_2)\right\}.$$

In some embodiments, A is the area of at least one of the first primitive or the second primitive. In some embodiments, $x_0$, $y_0$, $x_1$, $y_1$, $x_2$, and $y_2$ are coordinates of vertices of the at least one of the first primitive or the second primitive. In some embodiments, $t_0$, $t_1$, and $t_2$ are the values of the "t" attribute at each of the three vertices, (x0, y0), (x1, y1), and (x2,y2), respectively. For each primitive arriving at the rasterizer and then the packer, there may be zero or more attributes to be interpolated across the primitive. The values "s" and "t" may represent two such primitive attributes, and may be written as (s,t) to denote a texture coordinate at some particular pixel in a primitive, having been interpolated from the (s,t) values at each of the three vertices. The GPU 100 may include a memory configured to store the first direction derivative and the second directional derivative.

Some embodiments include a method for performing shader occupancy for small primitives using a GPU. The method may include receiving, by a shader warp packer unit, a first primitive associated with a first partially covered quad, and a second primitive associated with a second partially covered quad. The method may include determining, by the shader warp packer unit, that the first partially covered quad and the second partially covered quad have non-overlapping coverage. The non-overlapping coverage quality may not be required. In other words, the first partially covered quad and the second partially covered quad may have overlapping coverage, although at the cost of some additional buffering of data while pixels are processed in the one or more shader cores. The method may include packing, by the shader warp packer unit, the first partially covered quad and the second partially covered quad into a packed quad. The method may include sending, by the shader warp packer unit, the packed quad to one or more shader cores. In some embodiments, the first partially covered quad and the second partially covered quad are spatially disjoint from each other.

The method may include receiving and processing, by the one or more shader cores, the packed quad with no loss of information relative to the one or more shader cores individually processing the first partially covered quad and the second partially covered quad. The method may include assigning zero or more pixels from the packed quad to a single lane for a single-lane operation. For example, a single "coverage" pixel may be assigned to a lane, and then zero, one, or two H pixels may be assigned to the same lane. The method may include computing a directional derivative in the single-lane operation. The method may include computing, in a first operating mode, by at least one of i) the one or more texture units or ii) the one or more shader cores, the directional derivative in the single-lane operation. The method may include computing, in a second operating mode, by the at least one of i) the one or more texture units or ii) the one or more shader cores, a second directional derivative in a cross-lane operation. The method may include choosing, by at least one of i) the one or more texture units or ii) the one or more shader cores, at least one of the first operating mode or the second operating mode based on at least one run-time flag.

The method may include storing, by the shader warp packer unit, attribute information associated with at least one pixel of the packed quad. The method may include computing, by at least one of i) the one or more texture units, or ii) the one or more shader cores, a directional derivative based on the attribute information.

The method may include computing, by at least one of i) the one or more texture units or ii) the one or more shader cores, a first directional derivative in an X direction according to:

$$\left\{\frac{(y_0-y_2)}{2\cdot A}\cdot(t_0-t_2)\right\}+\left\{\frac{(y_1-y_0)}{2\cdot A}\cdot(t_1-t_2)\right\};$$

and computing, by the at least one of i) the one or more texture units or ii) the one or more shader cores, a second directional derivative in a Y direction according to:

$$-\left\{\frac{(x_0-x_2)}{2\cdot A}\cdot(t_0-t_2)\right\}-\left\{\frac{(x_1-x_0)}{2\cdot A}\cdot(t_1-t_2)\right\}.$$

In some embodiments, wherein A is a total area of at least one of the first primitive or the second primitive. In some embodiments, $x_0$, $y_0$, $x_1$, $y_1$, $x_2$, and $y_2$ are coordinates of vertices of at least one of the first primitive or the second primitive.

The blocks or steps of a method or algorithm and functions described in connection with the embodiments disclosed herein may be embodied directly in hardware, in a software module executed by a processor, or in a combination of the two. Modules may include hardware, software, firmware, or any combination thereof. If implemented in software, the functions may be stored on or transmitted over as one or more instructions or code on a tangible, non-transitory computer-readable medium. A software module may reside in Random Access Memory (RAM), flash memory, Read Only Memory (ROM), Electrically Programmable ROM (EPROM), Electrically Erasable Programmable ROM (EEPROM), registers, hard disk, a removable disk, a CD ROM, or any other form of storage medium known in the art.

The following discussion is intended to provide a brief, general description of a suitable machine or machines in which certain aspects of the inventive concept can be implemented. Typically, the machine or machines include a system bus to which is attached processors, memory, e.g., RAM, ROM, or other state preserving medium, storage devices, a video interface, and input/output interface ports. The machine or machines can be controlled, at least in part, by input from conventional input devices, such as keyboards, mice, etc., as well as by directives received from another machine, interaction with a virtual reality (VR) environment, biometric feedback, or other input signal. As used herein, the term "machine" is intended to broadly encompass a single machine, a virtual machine, or a system of communicatively coupled machines, virtual machines, or devices operating together. Exemplary machines include computing devices such as personal computers, workstations, servers, portable computers, handheld devices, telephones, tablets, etc., as well as transportation devices, such as private or public transportation, e.g., automobiles, trains, cabs, etc.

The machine or machines can include embedded controllers, such as programmable or non-programmable logic devices or arrays, ASICs, embedded computers, cards, and the like. The machine or machines can utilize one or more connections to one or more remote machines, such as through a network interface, modem, or other communicative coupling. Machines can be interconnected by way of a physical and/or logical network, such as an intranet, the Internet, local area networks, wide area networks, etc. One skilled in the art will appreciate that network communication can utilize various wired and/or wireless short range or long range carriers and protocols, including radio frequency (RF), satellite, microwave, Institute of Electrical and Electronics Engineers (IEEE) 545.11, Bluetooth®, optical, infrared, cable, laser, etc.

Embodiments of the present disclosure can be described by reference to or in conjunction with associated data including functions, procedures, data structures, application programs, etc. which when accessed by a machine results in the machine performing tasks or defining abstract data types or low-level hardware contexts. Associated data can be stored in, for example, the volatile and/or non-volatile memory, e.g., RAM, ROM, etc., or in other storage devices and their associated storage media, including hard-drives, floppy-disks, optical storage, tapes, flash memory, memory sticks, digital video disks, biological storage, etc. Associated data can be delivered over transmission environments, including the physical and/or logical network, in the form of packets, serial data, parallel data, propagated signals, etc., and can be used in a compressed or encrypted format. Associated data can be used in a distributed environment, and stored locally and/or remotely for machine access.

Having described and illustrated the principles of the present disclosure with reference to illustrated embodiments, it will be recognized that the illustrated embodiments can be modified in arrangement and detail without departing from such principles, and can be combined in any desired manner. And although the foregoing discussion has focused on particular embodiments, other configurations are contemplated. In particular, even though expressions such as "according to an embodiment of the inventive concept" or the like are used herein, these phrases are meant to generally reference embodiment possibilities, and are not intended to limit the inventive concept to particular embodiment configurations. As used herein, these terms can reference the same or different embodiments that are combinable into other embodiments.

Embodiments of the present disclosure may include a non-transitory machine-readable medium comprising instructions executable by one or more processors, the instructions comprising instructions to perform the elements of the inventive concepts as described herein.

The foregoing illustrative embodiments are not to be construed as limiting the inventive concept thereof. Although a few embodiments have been described, those skilled in the art will readily appreciate that many modifications are possible to those embodiments without materially departing from the novel teachings and advantages of the present disclosure. Accordingly, all such modifications are intended to be included within the scope of this present disclosure as defined in the claims.

What is claimed:

1. A graphics processing unit (GPU), comprising:
    one or more shader cores;
    a shader warp packer unit configured to:
        receive a first primitive associated with a first partially covered quad, and a second primitive associated with a second partially covered quad,
        determine that the first partially covered quad and the second partially covered quad have non-overlapping coverage,
        pack the first partially covered quad and the second partially covered quad into a packed quad,
        send the packed quad to the one or more shader cores, and
        assign zero or more pixels from the packed quad to a single lane for a single-lane operation;
    one or more texture units;
    a first operating mode in which at least one of i) the one or more texture units or ii) the one or more shader cores are configured to compute a directional derivative in the single-lane operation; and
    a second operating mode in which the at least one of i) the one or more the texture units or ii) the one or more shader cores are configured to compute a second directional derivative in a cross-lane operation,
    wherein the first partially covered quad and the second partially covered quad are spatially disjoint from each other.

2. The GPU of claim 1, wherein the one or more shader cores are configured to receive and process the packed quad with no loss of information relative to the one or more shader cores individually processing the first partially covered quad and the second partially covered quad.

3. The CPU of claim 1, wherein the one or more shader cores are configured to compute the directional derivative in the single-lane operation.

4. The GPU of claim 1, wherein the one or more shader cores are configured to compute the directional derivative in a cross-lane operation.

5. The GPU of claim 1, wherein the at least one of i) the one or more texture units or ii) the one or more shader cores are configured to choose at least one of the first operating mode or the second operating mode based on at least one run-time flag.

6. The GPU of claim 1, wherein:
    the shader warp packer unit is configured to store attribute information associated with at least one pixel of the packed quad; and
    at least one of i) the one or more texture units or ii) the one or more shader cores are configured to compute the directional derivative based on the attribute information.

7. The GPU of claim 1, wherein at least one of i) the one or more texture units or ii) the one or more shader cores are configured to compute the directional derivative based on one or more barycentric factors.

8. The GPU of claim 1, wherein at least one of i) the one or more texture units or ii) the one or more shader cores are configured to compute the directional derivative based on one or more partial differentials.

9. A graphics processing unit (GPU), comprising:
    one or more shader cores;
    a shader warp packer unit configured to:
        receive a first primitive associated with a first partially covered quad, and a second primitive associated with a second partially covered quad,
        determine that the first partially covered quad and the second partially covered quad have non-overlapping coverage,
        pack the first partially covered quad and the second partially covered quad into a packed quad, and
        send the packed quad to the one or more shader cores; and
    one or more texture units, wherein:
    the first partially covered quad and the second partially covered quad are spatially disjoint from each other;
    at least one of i) the one or more texture units or ii) the one or more shader cores are configured to compute a first directional derivative in an X direction according to:

$$\left\{\frac{(y_0 - y_2)}{2 \cdot A} \cdot (t_0 - t_2)\right\} + \left\{\frac{(y_1 - y_0)}{2 \cdot A} \cdot (t_1 - t_2)\right\};$$

and
   at least one of i) the one or more texture units or ii) the one or more shader cores are configured to compute a second directional derivative in a Y direction according to:

$$-\left\{\frac{(x_0 - x_2)}{2 \cdot A} \cdot (t_0 - t_2)\right\} - \left\{\frac{(x_1 - x_0)}{2 \cdot A} \cdot (t_1 - t_2)\right\},$$

wherein A is a total area of at least one of the first primitive or the second primitive;
   wherein $x_0$, $y_0$, $x_1$, $y_1$, $x_2$, and $y_2$ are coordinates of vertices of the at least one of the first primitive or the second primitive; and
   wherein $t_0$, $t_1$, and $t_2$ are values associated with the vertices.

10. The GPU of claim 9, further comprising a memory configured to store the first direction derivative and the second directional derivative.

11. A method for performing shader occupancy for small primitives using a graphics processing unit (GPU), the method comprising:
   receiving, by a shader warp packer unit, a first primitive associated with a first partially covered quad, and a second primitive associated with a second partially covered quad;
   determining, by the shader warp packer unit, that the first partially covered quad and the second partially covered quad have non-overlapping coverage;
   packing, by the shader warp packer unit, the first partially covered quad and the second partially covered quad into a packed quad;
   sending, by the shader warp packer unit, the packed quad to one or more shader cores;
   computing, in a first operating mode, by at least one of i) one or more texture units or ii) the one or more shader cores, a directional derivative in the single-lane operation;
   computing, in a second operating mode, by the at least one of i) the one or more texture units or ii) the one or more shader cores, a second directional derivative in a cross-lane operation; and
   choosing, by at least one of i) the one or more texture units or ii) the one or more shader cores, at least one of the first operating mode or the second operating mode based on at least one run-time flag,
   wherein the first partially covered quad and the second partially covered quad are spatially disjoint from each other.

12. The method of claim 11, further comprising:
   receiving and processing, by the one or more shader cores, the packed quad with no loss of information relative to the one or more shader cores individually processing the first partially covered quad and the second partially covered quad.

13. The method of claim 11, further comprising:
   assigning zero or more pixels from the packed quad to a single lane for a single-lane operation; and
   computing the directional derivative in the single-lane operation.

14. The method of claim 11, further comprising:
   storing, by the shader warp packer unit, attribute information associated with at least one pixel of the packed quad; and
   computing, by at least one of i) one or more texture units or ii) the one or more shader cores, the directional derivative based on the attribute information.

15. The method of claim 11, further comprising:
   computing, by at least one of i) one or more texture units or ii) the one or more shader cores, a first directional derivative in an X direction according to:

$$\left\{\frac{(y_0 - y_2)}{2 \cdot A} \cdot (t_0 - t_2)\right\} + \left\{\frac{(y_1 - y_0)}{2 \cdot A} \cdot (t_1 - t_2)\right\};$$

and
   computing, by the at least one of i) the one or more texture units or ii) the one or more shader cores, a second directional derivative in a Y direction according to:

$$-\left\{\frac{(x_0 - x_2)}{2 \cdot A} \cdot (t_0 - t_2)\right\} - \left\{\frac{(x_1 - x_0)}{2 \cdot A} \cdot (t_1 - t_2)\right\},$$

wherein A is a total area of at least one of the first primitive or the second primitive;
   wherein $x_0$, $y_0$, $x_1$, $y_1$, $x_2$, and $y_2$ are coordinates of vertices of at least one of the first primitive or the second primitive; and
   wherein $t_0$, $t_1$, and $t_2$ are values associated with the vertices.

16. The method of claim 11, further comprising:
   determining, by the shader warp packer unit, that the first partially covered quad and the second partially covered quad have overlapping coverage;
   packing, by the shader warp packer unit, the first partially covered quad and the second partially covered quad having overlapping coverage into a second packed quad; and
   sending, by the shader warp packer unit, the second packed quad to the one or more shader cores.

\* \* \* \* \*